Aug. 19, 1969 — J. A. CALOIA — 3,461,606
ROOT WATERING DEVICE
Filed Feb. 17, 1967

INVENTOR.
JOHN A. CALOIA,
BY
Berman, Davidson & Berman
ATTORNEYS.

United States Patent Office 3,461,606
Patented Aug. 19, 1969

3,461,606
ROOT WATERING DEVICE
John A. Caloia, Rte. 2, Box 440,
Elsinore, Calif. 92330
Continuation-in-part of application Ser. No. 471,223,
July 12, 1965. This application Feb. 17, 1967, Ser.
No. 621,390
Int. Cl. A01g 29/00; B01d 3/00
U.S. Cl. 47—48.5     6 Claims

ABSTRACT OF THE DISCLOSURE

A root watering device including a receptacle buried in an opening in soil below an upward conical extension of the opening. A plastic shield having a dependent conical portion covers the opening with a space between the dependent conical portion of the shield and the conical extension of the opening to permit the earth emanations from the opening to condense on the underside of the shield. The receptacle is provided with a side aperture for entrance of a tree root and a top aperture for entrance of condensate trickling down the shield, the vertex of the shield being held directly above and slightly spaced from said top aperture. Desirably another opening is formed near the shield vertex to permit entrance of nutrients into the receptacle from the upper surface of the shield.

---

This invention is a continuation-in-part of United States application Ser. No. 471,223, filed July 12, 1965, and having the same title and now abandoned.

The present invention relates to the watering, irrigation and feeding of plants, vines and trees by a novel receptacle and shield device which is particularly designed to take advantage of soil emanations, condensing and feeding them to a receptacle which, in turn, feeds the roots by reason of the natural inherent tendency of trees and plant roots to seek water.

The primary object of the present invention is to provide an apparatus for conserving water and nutrients, as well as manual labor of watering and feeding of plants, avoiding the wastefully watering of an entire surrounding surface area, as is currently done in present irrigating practices, the apparatus including a "drinking" receptacle beneath the surface of the soil for the roots alone and which is automatically replenished by said exudations and rainfall.

An important object of the present invention is, in addition to the capability of manually filling the receptacle periodically with water, to also automatically abstract some of the moisture in the soil for replenishment of the receptacle, as approximately 30 gallons of water are normally dispersed in each cubic yard of seemingly dry soil and which water through evaporation is unavailable to plants and trees without the present device.

Another aspect of the present invention pertains to, and is based upon a commonly known law of nature The sun through its radiance constantly abstracts and evaporates moisture from the soil surface. Deeper moisture deposited by rainfall is drawn constantly to the soil surface by capillary attraction. The subsequent evaporation robs the soil of precious moisture. The present invention interrupts the natural cycle by interposing a shield between the sun's rays and the moisture containing soil, thus inducing a condensation of the moisture vapor into droplets which are prevented from escaping, being channeled and conserved into receptacles for feeding roots as will be elaborated in the following description.

The novel features that are considered characteristic of the invention are set forth with particularity in the appended claims. The invention itself, however, both as to its organization and its method of operation, together with additional objects and advantages thereof, will best be understood from the following description of a specific embodiment when read in connection with the accompanying drawing, wherein like reference characters indicate like parts throughout the several figures and in which:

Figure 1:
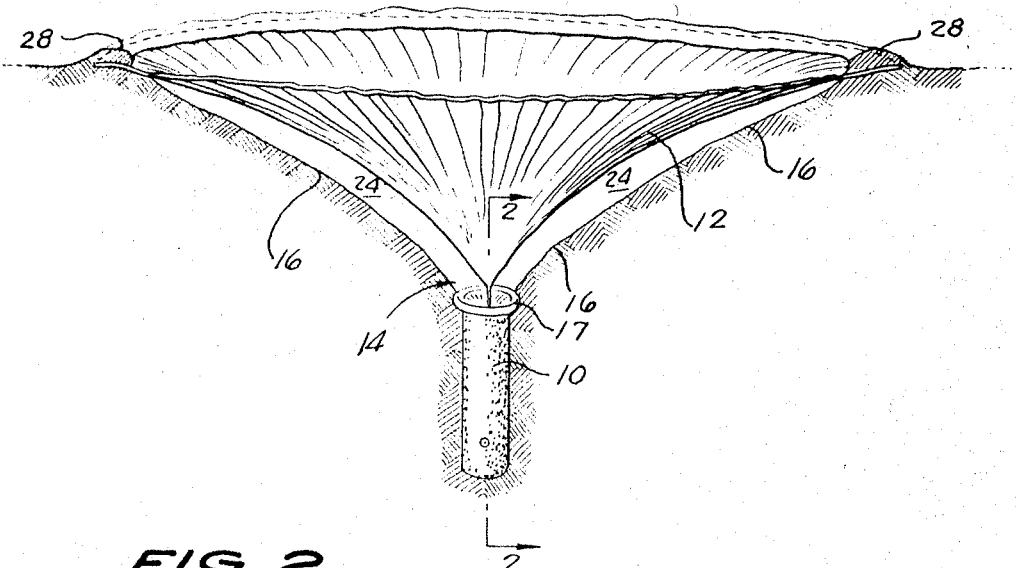
FIG. 1 is a perspective view of a preferred embodiment of the invention shown disposed in and covering an opening in the ground, the earth being broken away to reveal the arrangement.
Figure 2:
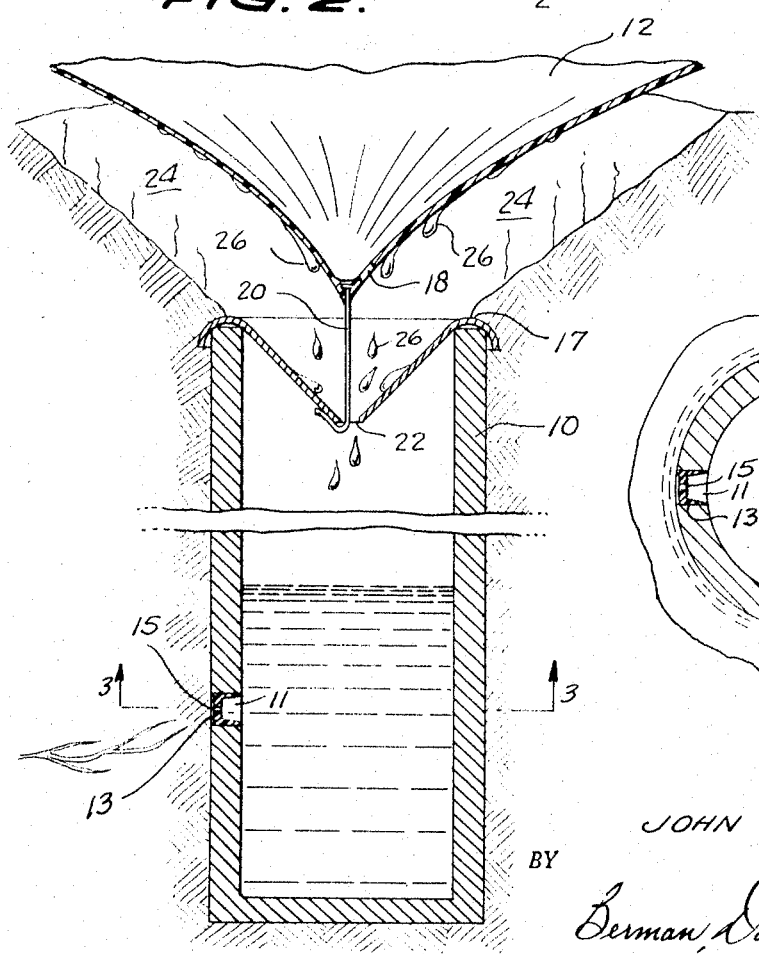
FIG. 2 is an enlarged sectional view taken along line 2—2 of FIG. 1, and looking in the direction of the arrows.
Figure 3:
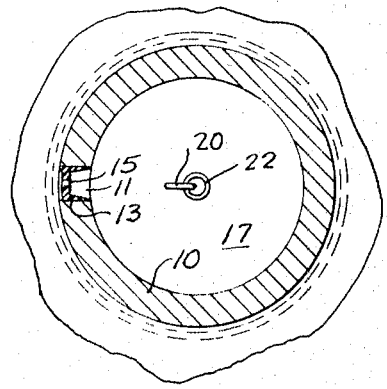
FIG. 3 is a section taken along the line 3—3 of FIG. 2, and looking upwardly in the direction of the arrows.

Referring now more particularly to the drawing, the present invention is illustrated as comprising a pipe-like receptacle 10 and an inverted conic cover 12 of substantially larger horizontal dimensions or diameter. The receptacle is buried in a hole 14 in soil, with its cover 17 approximately two feet beneath the surface of the soil. Hole 14 is extended upwardly to the surface by a conical portion 16 whose large base is at the top.

Upon being filled with water and plant nutrients the receptacle 10 permits a slow trickle of its contents into the surrounding soil depth by a moisture emanator, which percolating and trickling moisture is the medium for initially attracting roots. This feature which permits the escape of a minute amount of water is merely a hole 11 in the receptacle 10 plugged or covered by a flexible and resilient member which has a very small hole 15 in its center for the outward percolation of water from the receptacle. Once within, the flexible and resilient nature of the plug 13 permits expansion of aperture 15 commensurate with root growth and seals the receptacle, preventing or restricting any further escape of moisture.

The receptacle cover is a removable funnel which overlaps the upper edge of the receptacle. This cap restricts to a degree foreign matter from entering, prevents water loss by evaporation and provides a channel for filling the main body of the receptacles.

The ground cover, or shield 12, is preferably formed of a pliable and flexible plastic material which covers and is shaped to substantially conform to the dimensions and contours of a connicular depression 16 which has been formed in the earth directly above the sunken receptacle 10. In the vertex at the bottom of shield 12 is an orifice 18 which permits rainwater to infiltrate into the receptacle.

The hook 20 secured to the vertex of the shield 12 attaches to and anchors the shield to the cover 17 passing through the funnel aperture 22 while the balance of the shield 12 is spread over and shrouds the connicular depression 16 in the soil, the peripheral edge of the shield lying flat upon the surface of the soil weighted down and held in place by any convenient material, such as earth, rocks and the like spread thereon. Anchored thusly, the plastic shield is arranged in the form of an inverted cone leaving an air space 24 between itself and the connicular earth depression 16, the shield being stretched to maintain the air space 24 by hook 20 and weights 28.

The above described apparatus functions in the following manner. The shield 12 disrupts the evaporative processes occasioned by the sun's rays in the earth surrounding receptacle 10 and the resultant effluvia, or moisture vapors emanating from the soil, is prevented from wasting into the atmosphere, instead condensing into droplets 26 on the underside of the shield 12, which trickle down by gravity through the funnel cap 17 into the receptacle 10. Since the shield 12 is larger than receptacle 10, it covers a larger volume of earth and the resultant condensation on its underside is considerable, thus serving to continuously replenish the supply of water in receptacle 10. The sun acts in the same manner on the soil as on the atmosphere to abstract and evaporate vaporous emanations or exudations, although possibly not to the same extent due to the insulating effect of the upper layers of the earth. In any event, these moisture emanations which exude from the soil are similar to the vapors which rise from bodies of water in the evaporative process. By interposing a plastic shield, these vapors or effluvia are intercepted, causing them to coalesce into droplets on the underneath side of the shield and to eventually trickle downwardly into the open top of the receptacle below the shield, thus automatically replenishing the liquid therein.

Initially water and nutrients may be placed in receptacle 10 before it is buried, or afterward, by pouring onto the upper surface of shield 12 from which it passes through opening 18 to the receptacle. Rainfall serves to occasionally fill the receptacle in the same manner. The receptacle is maintained automatically replenished by the condensate on the underside of the shield resulting from ground exudations as explained above. Percolation of liquid out of opening 15 in plug 13 initially lures a root, or roots, into the receptacle 10. Once roots have invaded the receptacle, natural root growth seals the aperture preventing future fluid escape. Thenceforth, the tree or plant partakes of moisture and nutrients as required, much in the manner of animals drinking and eating at a trough. It is obvious that the described earth retentive feature and the feature of having the roots seek their own water, in contrast to the waste of water by dispersal over a large area offer great advantages over known constructions.

Although a certain specific embodiment of the invention has been shown and described, it is obvious that many modifications thereof are possible. The invention, therefore, is not to be restricted except insofar as is necessitated by the prior art and by the spirit of the appended claims.

What is claimed is:

1. A device for conserving soil moisture and nutrients for direct feeding to the roots of plants, vines and trees, comprising a shield adapted to be positioned as a cover for and spaced from the wall of a hole in a soil surface, a receptacle for water and other nutrients and adapted to be completely buried below said shield and spaced therefrom, said receptacle having horizontal dimensions considerably smaller than the corresponding dimensions of said shield, a first opening in a sidewall of said receptacle for entrance of roots, a second opening in a covering wall of said receptacle, said shield having a conical central portion whose vertex is at the bottom, and means securing the vertex of the shield to said covering wall adjacent the opening therein so as to position said vertex directly above the said second aperture in the receptacle, whereby condensation on the underside of the shield will trickle into said receptacle to continuously replenish the supply of liquid therein.

2. A device according to claim 1, wherein a small opening is provided in said vertex of the shield to permit draining of water from the upper surface of the shield to said receptacle.

3. A device according to claim 2, wherein said shield is formed of a flexible, sheet material and said means to secure the shield comprises a hook on the shield adapted to engage the wall of said second aperture.

4. A device according to claim 2, wherein said first aperture is covered by a flexible material having a very small hole in the center.

5. A device according to claim 2, wherein said covering wall of the receptacle has a central funnel-like portion terminating at its bottom in said second aperture.

6. A device for conserving soil moisture and nutrients for direct feeding to the roots of plants, vines and trees, comprising in combination a receptacle for water and other nutrients buried completely in soil in an opening therein which is extended upwardly to the soil surface by a conical portion whose base is at the soil surface, a shield having horizontal dimensions considerably larger than the corresponding dimensions of said receptacle and covering said opening and its extension with its perimeter at the surface of the soil, said shield having a central dependent conical portion spaced from the said conical portion of the soil opening to permit soil emanations to condense and run down the underside of the shield, a first opening in a sidewall of said receptacle for entrance of a plant root, a second opening in a covering wall of said receptacle, and means securing the vertex of said conical portion of the shield to said covering wall adjacent the opening therein with the vertex of said shield conical portion placed directly above and spaced from said second aperture to permit condensation on the underside of the shield to trickle into the receptacle.

References Cited

UNITED STATES PATENTS

| | | | |
|---|---|---|---|
| 2,685,761 | 8/1954 | Schlesser | 47—48.5 |
| 3,151,415 | 10/1964 | James | 47—48.5 |
| 2,877,164 | 3/1959 | Meyer | 202—185 |
| 3,290,230 | 12/1966 | Kobayashi | 202—234 |
| 3,336,206 | 8/1967 | Sasaki et al. | 202—234 |
| 3,337,418 | 8/1967 | Halacy | 202—83 |
| 3,408,260 | 10/1968 | Feldman et al. | 202—83 |

OTHER REFERENCES

A Method of Obtaining Water in Arid Lands, Kobayashi, Solar Energy, vol. 7, No. 3, 1963, pp. 94–99.

ROBERT E. BAGWILL, Primary Examiner

U.S. Cl. X.R.

165—45; 202—83